United States Patent
Döhler et al.

(10) Patent No.: US 9,978,166 B2
(45) Date of Patent: May 22, 2018

(54) SPEED DISPLAY

(71) Applicant: DEUTSCHES ZENTRUM FÜR LUFT- UND RAUMFAHRT E.V., Köln (DE)

(72) Inventors: Hans-Ulrich Döhler, Braunschweig (DE); Sven Schmerwitz, Braunschweig (DE)

(73) Assignee: DEUTSCHES ZENTRUM FUER LUFT—UND RAUMFAHRT E.V., Cologne (DE)

( * ) Notice: Subject to any disclaimer, the term of this patent is extended or adjusted under 35 U.S.C. 154(b) by 0 days. days.

(21) Appl. No.: 15/300,340

(22) PCT Filed: Mar. 27, 2015

(86) PCT No.: PCT/EP2015/056716
§ 371 (c)(1),
(2) Date: Sep. 29, 2016

(87) PCT Pub. No.: WO2015/150255
PCT Pub. Date: Oct. 8, 2015

(65) Prior Publication Data
US 2017/0140564 A1 May 18, 2017

(30) Foreign Application Priority Data
Apr. 1, 2014 (DE) .......... 10 2014 104 572

(51) Int. Cl.
*G06T 3/00* (2006.01)
*G06T 11/60* (2006.01)
(Continued)

(52) U.S. Cl.
CPC .............. *G06T 11/60* (2013.01); *G01C 23/00* (2013.01); *G01P 1/06* (2013.01); *G01P 3/00* (2013.01); *G06F 3/012* (2013.01); *G06T 13/80* (2013.01)

(58) Field of Classification Search
CPC ..................................................... G01C 23/00
(Continued)

(56) References Cited

U.S. PATENT DOCUMENTS 4,786,905 A * 11/1988 Muller ................. G01C 23/005
33/328
6,947,064 B1 * 9/2005 Hahn ................... G08G 1/0962
345/427
(Continued)

FOREIGN PATENT DOCUMENTS

DE 39 30 862 A1 3/1991
DE 698 05 839 T2 2/2003
(Continued)

*Primary Examiner* — Phi Hoang
(74) *Attorney, Agent, or Firm* — Whitham, Curtis & Cook, P.C.

(57) ABSTRACT

The invention relates to a method for the computer-controlled display of speed information, which represents the movement speed of a real moving object relative to the surroundings of the object, using an image display device. The speed information is displayed by generating one or more visually perceptible moving graphical patterns using the image display device, wherein the movement speed of the real moving object is reproduced by the one or more graphical patterns in a qualitative manner. The invention further relates to a device for the computer-controlled display of speed information, to a flying object with such a device, and to a computer program for this purpose.

16 Claims, 4 Drawing Sheets

Figure 1:
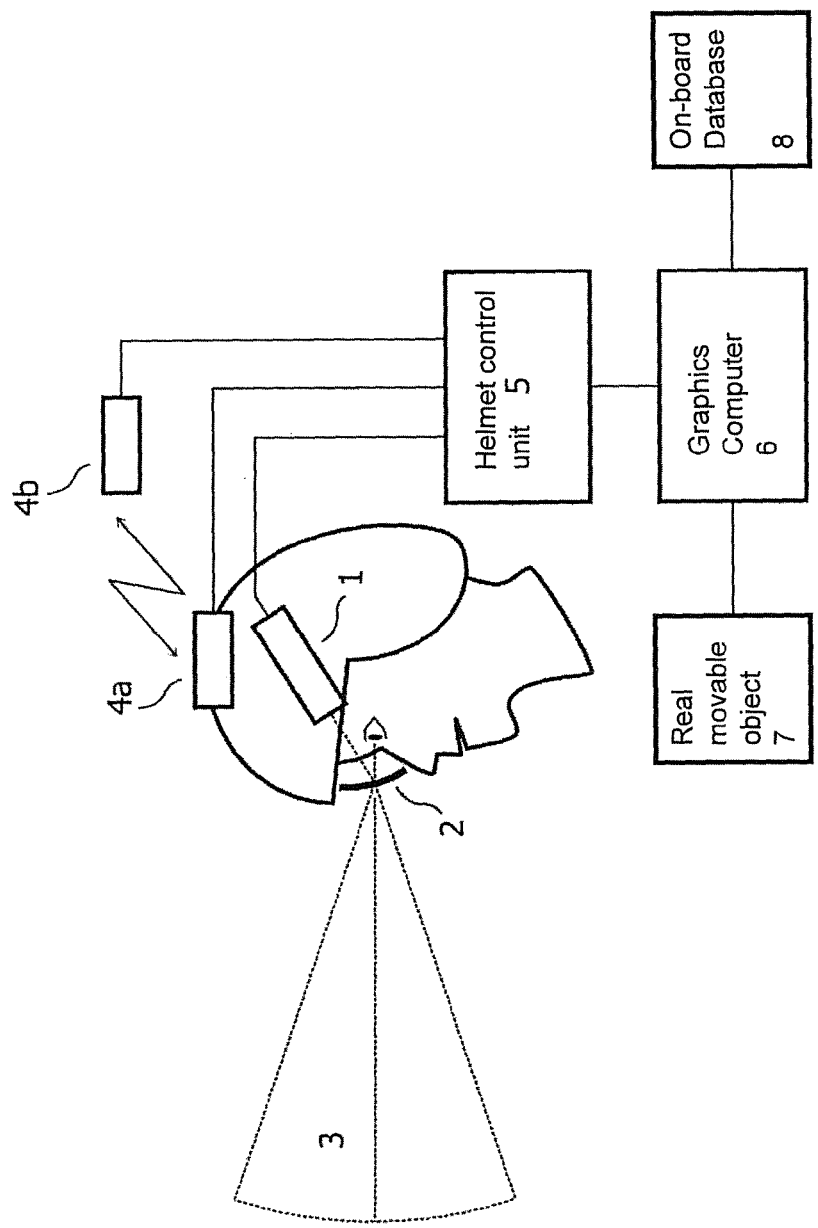

(51) Int. Cl.
*G01C 23/00* (2006.01)
*G01P 3/00* (2006.01)
*G01P 1/00* (2006.01)
*G06T 13/80* (2011.01)
*G06F 3/01* (2006.01)

(58) Field of Classification Search
USPC .......................................................... 340/971
See application file for complete search history.

(56) References Cited

U.S. PATENT DOCUMENTS

| | | | |
|---|---|---|---|
| 7,026,956 B1 * | 4/2006 | Wenger | G01C 23/00 340/945 |
| 7,091,881 B2 | 8/2006 | Judge et al. | |
| 7,369,939 B2 * | 5/2008 | Imai | G01C 21/3638 340/995.24 |
| 7,965,202 B1 | 6/2011 | Chiew et al. | |
| 8,295,997 B2 | 10/2012 | De Bono et al. | |
| 9,041,560 B2 * | 5/2015 | Venkataswamy | G08G 5/0013 340/457.1 |
| 2008/0243321 A1 * | 10/2008 | Walser | G05D 1/0206 701/21 |
| 2009/0138142 A1 * | 5/2009 | Still | G01C 23/00 701/4 |
| 2009/0140885 A1 * | 6/2009 | Rogers | G01C 5/005 340/977 |
| 2013/0041529 A1 * | 2/2013 | He | G08G 5/025 701/17 |
| 2014/0055323 A1 | 2/2014 | Servantie et al. | |
| 2014/0240148 A1 * | 8/2014 | Krishnamurthy | G01C 21/32 340/971 |
| 2014/0240464 A1 * | 8/2014 | Lee | G01S 17/08 348/47 |
| 2014/0266807 A1 * | 9/2014 | Behara | G01C 23/00 340/969 |

FOREIGN PATENT DOCUMENTS

| | | |
|---|---|---|
| DE | 10 2007 014 015 A1 | 9/2008 |
| DE | 10 2008 023 040 A1 | 11/2009 |
| DE | 10 2013 206 714 A1 | 2/2014 |
| DE | 10 2012 023 107 A1 | 6/2014 |
| EP | 1 598 642 A1 | 11/2005 |

* cited by examiner

SPEED DISPLAY

The invention relates to a method for the computer controlled display of speed information representing the movement speed of a movable real object relative to the surroundings thereof, by means of an image display unit as claimed in claim 1. The invention additionally relates to a device for the computer controlled display of speed information as claimed in claim 9, a flying object comprising such a device as claimed in claim 12, and a computer program therefor as claimed in claim 13.

A computer controlled display of speed information can be very helpful in diverse technical devices for operation and control. Particularly in technical devices whose control is relatively complex and accordingly places high demands on an operator, there is a need for a speed information display that is straightforward to grasp and intuitively understandable. This applies for example to land vehicles, watercraft, underwater vehicles and especially to aircraft or flying objects of any kind. In this case, particularly the control of helicopters already places high demands on the pilot anyway. Therefore, the invention and its advantages are explained below predominantly on the basis of the example of the control of helicopters, but this does not in any way restrict the general usability of the invention for other objects such as e.g. the vehicles mentioned above.

One phase of flight that requires extremely high concentration by the helicopter pilot is landing. During every landing the pilot has to ensure by means of suitable control inputs that in particular the lateral drift of the helicopter directly before touchdown does not exceed a specific magnitude. If this maximum permissible transverse drift is not complied with, a dangerous rolling moment may arise after the initial contact between the landing gear or undercarriage and the ground, which rolling moment may ultimately lead to lateral roll-over of the helicopter. In order that the pilot can assess the transverse drift at the moment of touchdown and compensate for it by means of control inputs, a visual detection of the direct surroundings of the helicopter that is as unrestricted as possible is necessary. In landings in which the visual detection of the surroundings is restricted by swirled up sand, dust or snow, dangerous situations and also accidents repeatedly occur. Particularly just before the helicopter touches down on a landing area, in sandy or snowy regions it can happen that the entire external field of view is no longer discernible and the visual position detection and assessment of the transverse drift are thus no longer possible for the pilot.

In order to improve this situation, DE 10 2007 014 015 A1, for example, proposes representing the speed of the helicopter above ground in a kind of virtual two-dimensional plan view of the landing site with the aid of a drift indicator connected by a virtual rubber band to the center point of the hovering flight symbolism. A speed scaling of the representation is realized by means of two concentric circles. By means of the position of the drift indicator or the length of the virtual rubber band, the pilot can quantitatively infer the drift speed of the helicopter above ground from the displayed information at any time.

Further display methods are known from the documents DE 10 2012 023 107 A1, DE 10 2013 206 714 A1, DE 10 2008 023 040 A1, DE 39 30 862 A1, U.S. Pat. No. 8,295,997 B2, U.S. Pat. No. 7,091,881 B2, US 2009/0 138 142 A1, DE 698 05 839 T2, EP 1 598 642 A1, U.S. Pat. No. 7,965,202 B1.

The invention is based on the object of specifying methods and devices for the computer controlled display of speed information which allow an even simpler and more intuitive detection of the movement speed of the movable real object relative to the surroundings thereof for a user.

This object is achieved by means of a method for the computer controlled display of speed information as claimed in claim 1.

The invention has the advantage of providing the user, and particularly in the case of helicopters the pilot, with the information required for carrying out the required control tasks, e.g. in the case of a landing in dusty or snowy regions, visually in a minimalized form, such that the additional cognitive loading is likewise minimized. This is done by generating one or a plurality of visually perceptible moving graphical patterns which can likewise be kept simple, e.g. can be simple geometrical figures. Moreover, the movement speed of the movable real object is reproduced only qualitatively, rather than—as in the prior art—quantitatively, i.e. with a numerical relation to the actual movement speed of the movable real object. By means of psychologically suitable selection and arrangement of the graphical patterns represented, the cognitive loading can be reduced further and, in particular, shifted into the range of the at least occasionally unconscious perception of a human being. As a result, it becomes possible that the user, e.g. the pilot, for intuitive perception of the speed information represented, need not concentrate on a specific represented element or graphical pattern, e.g. in contrast to the drift indicator in DE 10 2007 014 015 A1, which has to be concretely observed by the pilot in order to obtain the desired information about the drift speed. Rather, the speed information can be conveyed to the user or pilot as it were "incidentally".

A further advantage of the invention in the application of piloting aircraft is that weather- or atmosphere-dictated restrictions of natural external visibility can be compensated for with the aid of the computer controlled display of the speed information and, if appropriate, the visually conformal representation. It thus becomes possible, for example, to carry out helicopter flights with reduced visibility in a significantly simpler manner. In particular, a landing in swirled up dust, sand or snow can now be carried out in a simpler and safer manner.

The kind of display of a qualitative speed representation according to the invention should be used in a helpful manner particularly if the underlying regulating task necessitates keeping a speed or speed difference sufficiently small. Precisely this application is present e.g. in the case of a helicopter landing. In a similar manner to how an article can be horizontally aligned using the indicator level of a spirit level, without quantitative/numerical information about a deviation angle from the horizontal being present, but small deviations from the horizontal can nevertheless be grasped intuitively therewith, the present invention, by virtue of the qualitative reproduction of the movement speed by means of the one or the plurality of moving graphical patterns, likewise affords the possibility of carrying out control or regulation toward a specific target without the need to grasp complex data, namely the possibility of achieving a drift speed of zero in the case of a helicopter.

However, the invention can also be used in applications in which the speed regulating task consists in complying as well as possible with a specific speed different than zero. The input variable of the method according to the invention, the speed information, is then fed as a difference value between setpoint speed and actual speed.

Generally, in the case of the invention the speed information can be ascertained by means of sensors and fed to the method or the device also explained below e.g. via a data interface. As the speed information e.g. the real speed (actual speed) can be fed or, as mentioned above, a difference speed determined as the difference between the actual speed and a setpoint speed.

The image display unit may be any arbitrary technical image display unit that is currently available or will be developed in the future, such as e.g. a monitor, a flat screen or a display of any type or a projector, e.g. a beamer, a virtual reality display, an augmented reality display, a partly transparent mirror display, a laser projector, a virtual retinal display. The image display unit may be embodied e.g. in the form of a head-up display or helmet mounted display. Such image display units have an image display region within which it is possible to represent image data. The image data are represented on an image display area. In image display units according to the projection principle, the image display area may be a projection area that is not part of the image display unit. In all other image display units, the image display area is part of the image display unit, e.g. in the form of an LCD display.

If a helmet mounted display (HMD) is provided as the image display unit, it is advantageous to provide a semi-transmissive mirror in such a system, which mirror projects a computer-generated image in front of the observer's eyes. By means of suitable optical elements between the projector of the image display unit and the observer's eye, it is possible to ensure that the focal plane of the represented image corresponds to an adaptation of the eye to long distance, e.g. a distance range of greater than 20 meters. Therefore, on the retina in the observer's eye the image of the real external view appears just as sharply as the superimposed computer-generated image representation.

In accordance with one advantageous development of the invention, the moving graphical pattern or graphical patterns is or are moved in a one-dimensional movement in the image display region of the image display unit. This further improves the simple and intuitive understandability of the conveyed qualitative speed information and thus additionally relieves the burden on the user.

In accordance with one advantageous development of the invention, the graphical pattern or graphical patterns is or are visualized together with a region of the real surroundings of the movable real object. In the process the graphical pattern or graphical patterns perform(s) a movement relative to the visualization of the real surroundings. On the image display area the graphical patterns thus move relative to objects of the represented surroundings. The simultaneous representation of a region of the real surroundings of the movable object together with the graphical pattern or graphical patterns has the advantage that the user, in order to perceive the speed information reproduced by the graphical patterns, does not have to avert his/her gaze from the real surroundings. Constant movement back and forth and refocusing of the eyes are thereby avoided, which makes it significantly simpler for the user, in particular the helicopter pilot in a landing situation, to perform his/her control tasks with concentration.

In accordance with one advantageous development of the invention, the graphical pattern or graphical patterns is or are visualized together with a region of the real surroundings of the movable object in a visually conformal representation. Visually conformal representation denotes a reproduction which is congruent with the real external view and follows a head movement by the observer. This can be done e.g. by detecting the head movement of the observer, e.g. by means of a head tracker. In this case, the orientation of the sight axis of the observer can be taken into account in the generation of the images represented by the image display unit. By virtue of the representation also of the graphical pattern or graphical patterns in the visually conformal representation, these can be reproduced relative to the visualized surroundings such that they do not move relative thereto and appear as it were to cling to specific objects in the real surroundings. In the case of an aircraft, in addition to the head movement, the position and orientation of the aircraft can also be taken into account, e.g. by taking account of data of a navigation system and/or of an inertial sensor system. If, in combination therewith, a movement of the graphical pattern or graphical patterns relative to the visualization of the real surroundings is intended to be effected, this can be realized e.g. by the graphical pattern or graphical patterns being moved along specific lines or edges that stand out in the visualized surroundings, e.g. in the form of a one-dimensional movement along the horizon or along a boundary edge of the landing area of the aircraft.

In accordance with one advantageous development of the invention, at least one parameter of the movement of the graphical pattern or graphical patterns is determined depending on the movement speed of the movable real object relative to the surroundings. As parameter of the movement of the graphical pattern or graphical patterns, the speed thereof at which they are moved over the image display area is determined, as mentioned. In this regard, e.g. in the case of a high movement speed of the movable real object, the graphical pattern can be moved over the image display area more rapidly than in the case of a low movement speed of the movable real object. If the movement speed of the movable real object, e.g. the undesired transverse drift speed in the case of a helicopter landing, is adjusted to approximately the value zero or at least to a value below a critical limit value, then the movement of the graphical pattern or graphical patterns on the image display area can also be ended, i.e. the pattern is stopped and remains at the last represented position of the image display area.

In accordance with one advantageous development of the invention, the speed of the movement of the graphical pattern or graphical patterns is determined correctly in terms of sign depending on the movement speed of the movable real object relative to the surroundings. This leads to further improvements in the intuitive understandability of the represented movement speed. As a result, for example, just a movement tendency of the real object can be visualized, i.e. the speed information supplied is reduced in the qualitative representation e.g. to left/right information or forward/backward information. The conversion of the movement speed of the movable real object into the speed of the movement of the graphical pattern or graphical patterns on the image display area can be effected by means of a linear or nonlinear relationship, wherein in this case the speed information can be amplified or attenuated during the conversion into the speed of the movement of the graphical pattern or graphical patterns. The assignment between the speed information and the speed of the movement of the graphical pattern or graphical patterns can be effected, in principle, according to any arbitrary function or relation, including in the form of piecewise linear or nonlinear defined functions and/or relations.

In accordance with one advantageous development of the invention, at least one parameter of the movement of the graphical pattern or graphical patterns is varied in a continuously variable manner or in predetermined steps. In this regard, e.g. the speed of the movement of the graphical pattern or graphical patterns can be varied in specific steps, e.g. the three steps "no movement", "slow movement", "fast movement". The exact values for the speed of the movement should be defined depending on the technical configuration of the units used, in particular of the image display unit, such that undesired interference effects e.g. with the image refresh rate of the image display unit do not occur. In the case, too, of continuously variable variation of the speed of the movement of the graphical pattern or graphical patterns, undesired interference phenomena should be prevented by suitable selection of limit values.

In accordance with one advantageous development of the invention, it is provided that the at least one parameter of the movement of the graphical pattern or graphical patterns is determined and/or varied depending on one or a plurality of further parameters, i.e. alongside the one parameter already mentioned, of the movable real object ascertained by sensors. As further parameters for influencing the movement of the graphical pattern or graphical patterns, use may be made of e.g. the distance between the movable real object and other objects or articles or, in the case of a flying object, the altitude. In this regard, e.g. the degree of amplification or attenuation during the conversion of the speed information into the speed of the movement of the graphical pattern or graphical patterns can be made dependent on one or a plurality of such parameters. This allows a very flexible adaptation of the type of representation of the speed information depending on the operating situation of the movable real object, e.g. depending on the flight situation of the helicopter.

In accordance with one advantageous development of the invention, the moved graphical pattern or graphical patterns is or are represented in the outer edge region of the image display region of the image display unit. This has the advantage that the central region of the image display region, said central region being principally perceived intuitively by an observer, does not have to be occupied by the graphical patterns and, accordingly, other information or, particularly in the case of a visually conformal representation, a region of the real surroundings can be represented there. A further advantage is that by shifting the graphical pattern or graphical patterns into the edge region, the information represented by the patterns regarding the level of the at least occasionally unconscious perception of a human being can be fed to the latter. By extending the information transfer from conscious perception to the level of an occasionally unconscious perception, it is possible to reduce the information bandwidth of the conscious visual information, thus simultaneously relieving the burden on the conscious visual channel. In this way, the moved graphical pattern or graphical patterns can be reproduced in the peripheral field of view of the image display area and thus in the peripheral field of view of an observer.

The speed information can represent the absolute value of the movement speed of the movable real object e.g. as a scalar quantity.

In accordance with one advantageous development of the invention, one or a plurality of the following speed components of the movement speed of the movable real object is or are displayed by means of the graphical pattern or graphical patterns: longitudinal speed, lateral speed, vertical speed. The longitudinal speed is the speed component in the longitudinal direction (longitudinal axis) of the movable real object, the lateral speed is the speed component in the transverse direction (transverse axis) and the vertical speed is the speed component in the direction of the vertical axis. In this way, the represented speed information can be further simplified and rectified and in particular restricted to a speed component that is relevant in concrete terms in practice, such as e.g. the lateral speed in the case of the helicopter landing. In accordance with one advantageous development of the invention, the method is used for the computer controlled display of a plurality of items of speed information which are respective speed components of the movement speed of the movable real object. In this regard, by way of example, the lateral speed can be displayed by graphical patterns moved horizontally on the image display area, and the longitudinal or vertical speed by vertically moved graphical patterns.

In accordance with one advantageous development of the invention, one, a plurality or all of the graphical patterns are selected from the set of the following patterns:

a) periodic patterns, b) non-periodic patterns, c) random patterns, d) textures, e) surface patterns of natural objects, f) dashed-line patterns, g) bar patterns, h) rectangle patterns.

In order to represent different items of speed information or different components of the movement speed of the movable real object, patterns of identical type or different types of patterns can be selected therefrom, e.g. a dashed-line pattern for the representation of the lateral speed and a random pattern for the representation of the longitudinal speed. This simplifies the intuitive differentiation of the items of information represented, without high cognitive effort for the observer.

The invention as claimed in claim 9 furthermore relates to a device for the computer controlled display of speed information representing the movement speed of a movable real object relative to the surroundings thereof, by means of an image display unit, wherein the speed information is fed to the device, wherein the device is designed for displaying the speed information in accordance with a method of the type mentioned above. The advantages explained above can likewise be achieved by means of such a device. The device can comprise e.g. the image display unit and, if appropriate, further components, such as e.g. a head tracker. In accordance with one advantageous development of the invention, the device comprises at least one head tracker or an interface to a head tracker and is designed for visually conformally outputting graphical information on the image display unit.

The object mentioned in the introduction is furthermore achieved as claimed in claim 12 by means of a flying object, in particular an aircraft, comprising a device of the type described above. In this case, particularly in the case of manned flying objects, the image display unit can be carried along in the flying object. The image display unit can e.g. be arranged in the region of the instrument panel or, particularly in the case of visually conformal representation, be embodied in the form of a head-up display or a helmet mounted display. The flying object can be embodied in particular as a helicopter.

The object mentioned in the introduction is furthermore achieved as claimed in claim 13 by means of a computer program comprising program code means designed for carrying out the method of the type described above when the computer program is executed on a computer.

The invention is explained in greater detail below on the basis of exemplary embodiments with the use of drawings.

In the figures:

FIG. 1 shows the basic construction of a helmet mounted display, and

Figure 2:
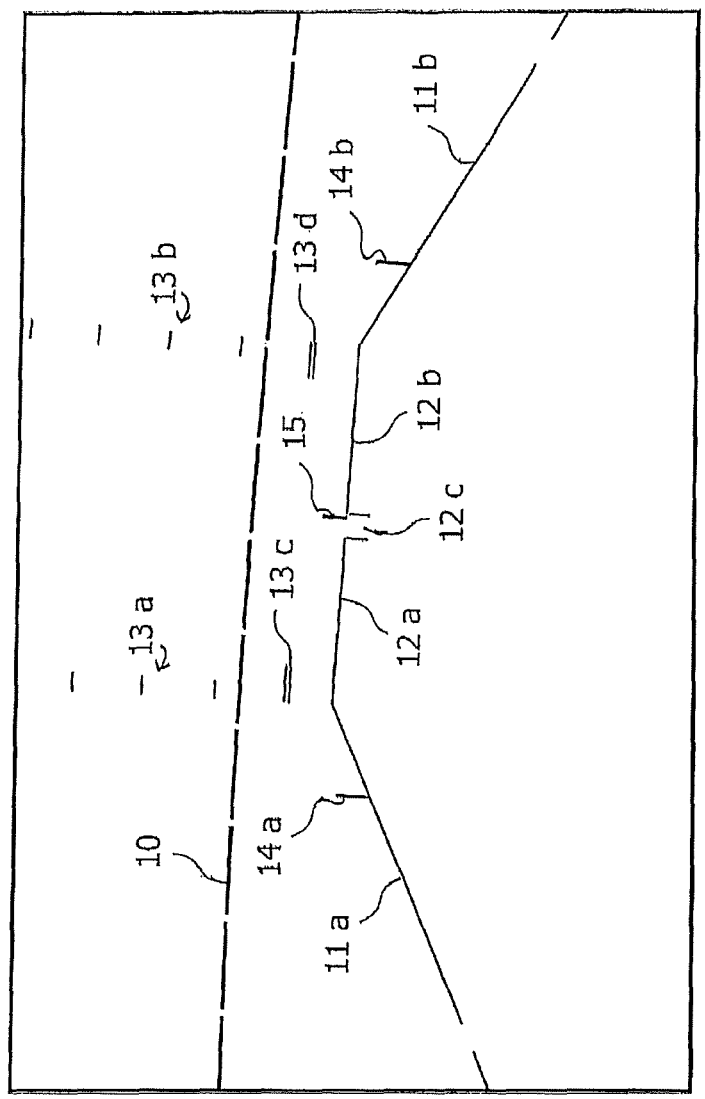
Figure 3:
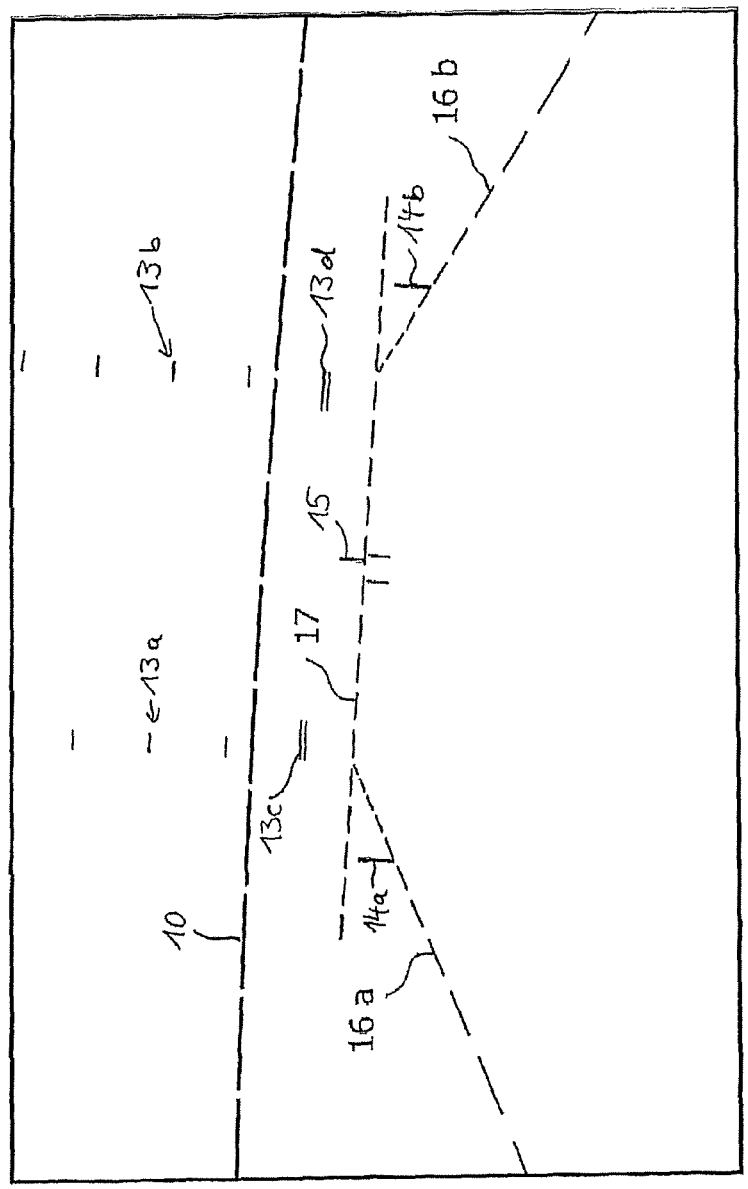
Figure 4:
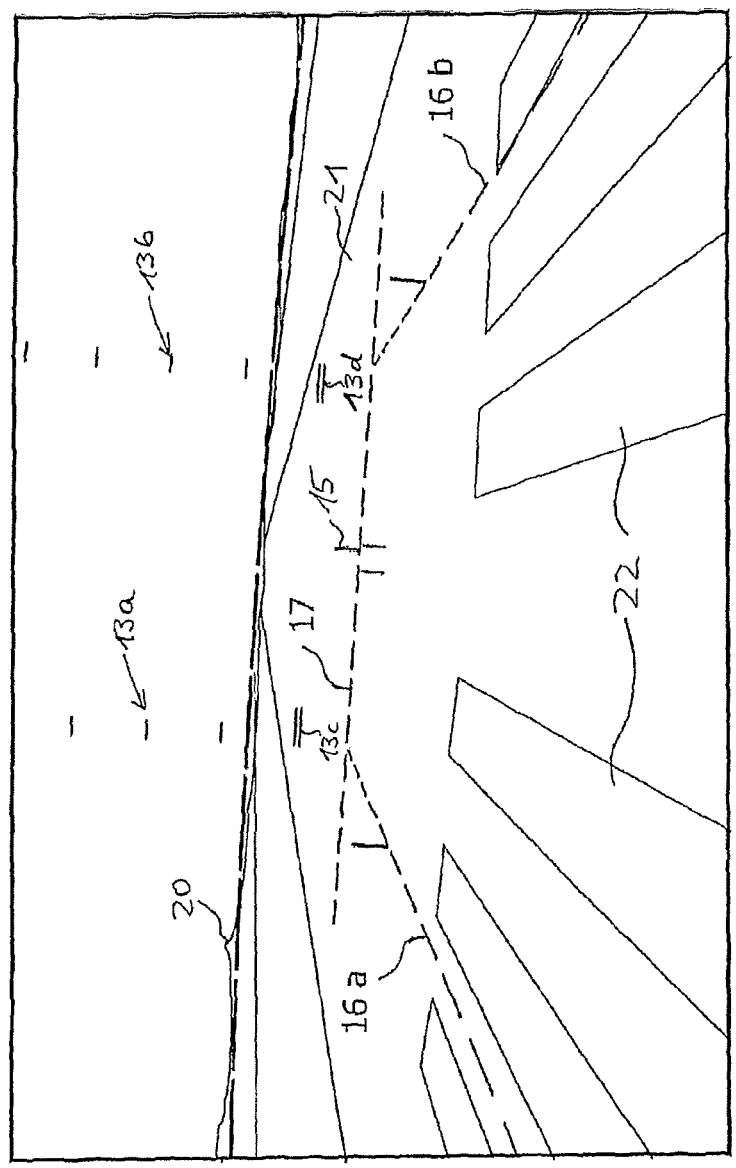

FIG. 2 shows one embodiment of the computer controlled display of a region of the real surroundings of the movable object by means of an image display unit in a visually conformal representation, and FIG. 3 shows the representation in accordance with FIG. 2, supplemented by a computer controlled display of speed information by means of moving graphical patterns, and FIG. 4 shows an image representation in accordance with FIGS. 2 and 3 with additionally supplemented elements of the real surroundings.

In the figures, identical reference signs are used for mutually corresponding elements.

FIG. 1 shows the basic construction of a so-called helmet mounted display, which, particularly for the case of a helicopter control, can advantageously be used as an image display unit for a realization of the invention. In the present-day state of the art, a helicopter pilot is often equipped with such an HMD anyway, such that only a few supplementations are necessary for a realization of the invention, such as e.g. an extension of the computer program of a computer, e.g. of a graphics computer.

In the case of the HMD in accordance with FIG. 1, a computer-generated graphical image is projected onto a semitransmissive mirror 2 for the user by means of an optoelectronic projector 1. The user's eye detects the external view, i.e. at least one region 3 of the real surroundings of the movable object, in this case a helicopter. In the representation visible to the user, the projected elements of the computer-generated image are superimposed on the external view. Suitable optical elements, e.g. a collimator, between the user's eye and the semitransmissive mirror 2 ensure that the adaptation of the eye to the projected image corresponds to the adaptation for "far distance" and both items of information are thus imaged with the same imaging sharpness on the user's retina.

The orientation of the user's head relative to the movable real object is detected by an element 4a fixed to the helmet. Said element cooperates with an element 4b mounted fixedly in the vicinity of the helmet. The elements 4a, 4b together form a so-called head tracker. For the technical realization of such head trackers, there are already proposals for mechanical, magnetic, optical and acoustic realizations, each of which is suitable for a realization of the present invention. The solid angles of the helmet relative to the direct surroundings, said solid angles being measured by the head tracker 4a, 4b, are detected in a helmet control unit 5. The helmet control unit 5 transmits the helmet orientation to a graphics computer 6 connected to it. Said graphics computer serves as a central computer for the computer controlled display of the speed information and further information, such as e.g. further images inserted into the HMD. The helmet control unit 5 receives the image data generated in the graphics computer 6 and conditions them such that they can be projected by means of the projector 1 and produce the desired image.

In order that the image generation in the graphics computer 6 is able to follow the movement of the movable real object (3D angle and 3D position) visually conformally, the relevant operating data, e.g. flight status data such as position, speed, attitude, altitude, etc., are communicated to the graphics computer 6 via an interface with the real movable object 7, e.g. with a central on-board computer.

Information comprising the parameters of possible landing sites, such as position, altitude, orientation, desired flight direction, etc., is kept available by means of a local on-board database 8. Supplementarily, imaging sensors, cameras, optical or millimeter-wave-based radar systems mounted on-board can also provide short-term detection data of potential landing sites in said database. The data supplied are processed in the graphics computer 6 to form a visually conformal representation of the generated image data. In this case, by way of example, specific elements or objects in the surroundings, e.g. the edges of a landing site, can be provided with special markings in the image representation by the graphics computer.

FIG. 2 shows one embodiment of the proposed visually conformal display initially without the representation of the speed information. In this case, the horizon line 10 is represented in dashed form (e.g. 5 degree intervals) over the entire image display area. In the lower part of the image display area, the virtual landing site is represented in the form of a partly reproduced rectangle imaged in perspective fashion. The lateral edges of the landing site are represented by the lines 11a and 11b. The front boundary of the landing site is represented by the lines 12a and 12b. 12c shows a gap between the lines 12a and 12b, which is additionally clarified by two perpendicular markings pointing downward. A marking 15 representing the lateral deviation of the helicopter from the center of the landing site moves along the lines 12a and 12b. Two further markings 14a and 14b represent the longitudinal deviation of the helicopter from the center of the landing site. The position of these markings is displaced forward by half the longitudinal extent of the landing site. If the helicopter is hovering exactly above the center of the landing site, the markings 14a and 14b appear at the front left and right corner, respectively, of the virtual representation of the landing site. In order to visualize the altitude of the helicopter above ground, a scale 13a to 13d graduated e.g. in 10-foot steps is represented above the two front corners of the landing site. The zero point of this altitude scale is formed by 13c and 13d, respectively. The reading of the altitude of the helicopter above ground is made possible at the points of intersection of the horizon line 10 with the altitude scale. For further improvement of the precision of this display, the vertical distance between the pilot's eyes and the landing gear of the helicopter can also be taken into account. This vertical distance can be seen from the distance between the front corners of the landing site and the zero point of the altitude scale.

FIG. 3 shows a representation in accordance with FIG. 2 altered by the computer controlled display of items of speed information according to the invention. In order to reproduce items of speed information, the boundary of the virtual landing site, which consisted of the lines 11a, 11b, 12a, 12b in accordance with FIG. 2, is now replaced by a dashed-line boundary comprising the lines 16a, 16b, 17. In order to represent speed information according to the invention by means of the dashed-line representation of the boundary, the lines 16a, 16b, 17 are moved on the image display area depending on specific components of the movement speed of the helicopter. In this case, the line patterns of the lines 16a, 16b move forward or back (in perspective view) depending on the longitudinal speed of the helicopter. The line pattern of the line 17 moves toward the left or right depending on the lateral speed. In this case, however, the lines 16a, 16b, 17 overall remain at their respective position. On the basis of the direction and speed of the movements of the moving graphical patterns created by the dashed-line boundaries, the pilot of the helicopter can readily detect whether the latter's flying speed, in particular the lateral speed, is low enough before the pilot sets down the helicopter on the landing site.

This display can likewise be used for "hover assistance".

FIG. 4 shows the superimposition of the described display format in accordance with FIG. 3 with the real surroundings as perceived by the pilot when looking through the HMD. By way of example, the horizon line with mountain ranges 20, a runway 21 and runway markings 22 are represented from the real surroundings. It can readily be seen that the transparency of the display is only minimally disturbed owing to the use of a small number of graphical elements. Unexpectedly appearing objects in the external view are thus rapidly detectable. On account of the conformity of the display, all elements always appear at the same location in the external view independently of the movement of the helicopter and independently of the movement of the helmet.

One aspect of the present invention is the representation of the speed relative to the ground by means of moved patterns. In order to ensure a good "transparency" of the display, the moving graphical patterns should be represented only at those locations in the display at which a line already appears anyway. In the embodiment proposed here, therefore, the edges of the visually conformally represented landing site are represented by dashed lines. The helicopter position relative to the edges of the landing site is thus still readable without restriction. In this case, the lateral deviation from the center of the landing site is represented by a marking at the front edge of the landing site. The longitudinal deviation from the center of the landing site is represented by a respective marking at the left and right edges of the landing site.

The longitudinal speed of the helicopter in the coordinate system of the landing site is visualized by the movement of the line pattern 16a, 16b at the left and right edges of the landing site. The transverse speed of the helicopter in the coordinate system of the landing site is visualized by the movement of the line pattern 17 at the front edge of the landing site. The represented movements of these patterns can be scaled by a nonlinear but sign-true scaling (e.g. arc-tangent function or root function) of the speeds. Speeds of a few +/−10 m/s down to +/−0.1 m/s are thus representable.

This type of display of a qualitative speed representation can be used in a helpful manner particularly if the underlying regulating task consists solely in keeping a speed sufficiently low.

Further fields of application are e.g. the design of a perspective guidance display e.g. for a vehicle or a taxiing aircraft at an airport, whereby the stipulation of a setpoint speed can be monitored. For this purpose, as moving graphical pattern e.g. in a visually conformal representation on the ahead part of the roadway it is possible to represent a superimposed dashed line whose line pattern moves away from the observer when the setpoint speed is undershot, or moves toward said observer when said setpoint speed is exceeded. If the setpoint speed is complied with exactly, the line pattern is able not to be moved.

The invention claimed is:

1. A method for computer controlled display of speed information representing movement speed of a movable real object relative to surroundings of the movable real object on an image display unit, comprising:
   generating one or a plurality of visually perceptible moving graphical patterns on the image display unit, wherein non-zero lateral movement speeds of the movable real object are always reproduced qualitatively by movement of the one or the plurality of graphical patterns, wherein at least a speed at which the one or the plurality of graphical patterns is or are moved over an image display area of the image display unit is determined depending on the lateral movement speed of the movable real object relative to the surroundings; and
   amplifying or attenuating the speed information of the lateral movement speed of the movable real object during conversion into the speed at which the one or the plurality of graphical patterns is or are moved over the image display area of the image display unit.

2. The method as claimed in claim 1, further comprising visualizing the one or the plurality of graphical patterns together with a region of the surroundings of the movable real object; and
   performing a movement of the one or the plurality of graphical patterns relative to a visualization of the surroundings obtained in the visualizing step.

3. The method as claimed in claim 1 wherein the one or the plurality of graphical patterns is or are generated in a visually conformal representation with a region of surroundings of the movable real object such that the one or the plurality of graphical patterns are stationary relative to the surroundings and appear to cling to specific objects in the surroundings.

4. The method of claim 3, wherein the one or the plurality of graphical patterns is or are generated taking into account an orientation of a sight axis of an observer as detected by a head tracker.

5. The method of claim 4, wherein the moveable real object is an aircraft, and wherein the one or the plurality of graphical patterns is or are generated further taking into account a position and orientation of the aircraft.

6. The method as claimed in claim 1 further comprising varying at least one parameter of the movement of the one or the plurality of graphical patterns in a continuously variable manner or in predetermined steps.

7. The method as claimed in claim 1 wherein at least one parameter of the movement of the one or the plurality of graphical patterns is determined and/or varied depending on one or a plurality of further parameters of the movable real object ascertained by sensors.

8. The method as claimed in claim 1 wherein the one or the plurality of graphical patterns is or are represented in an outer edge region of an image display region of the image display unit.

9. The method as claimed in claim 1 wherein said generating step includes displaying one or a plurality of speed components of the movement speed of the movable real object selected from the group consisting of longitudinal speed, lateral speed, and vertical speed.

10. The method of claim 9, wherein the one or the plurality of graphical patterns generated comprises at least one graphical pattern for each of longitudinal speed, lateral speed, and vertical speed respectively.

11. The method as claimed in claim 1 wherein one or more of the one or the plurality of graphical patterns are selected from the following patterns:
   a) periodic patterns,
   b) non periodic patterns,
   c) random patterns,
   d) textures,
   e) surface patterns of natural objects,
   f) dashed line patterns,
   g) bar patterns,
   h) rectangle patterns.

12. The method of claim 1, wherein the one or the plurality of graphical patterns are moved depending on the lateral movement speed relative to the ground.

13. A device for computer controlled display of speed information representing movement speed of a movable real object relative to surroundings of the movable real object, comprising:

an image display unit; and a computer which controls the image display unit;

wherein the computer directs the image display unit to display the speed information by generating one or a plurality of visually perceptible moving graphical patterns on the image display unit, wherein non-zero lateral movement speeds of the movable real object are always reproduced qualitatively by movement of the one or the plurality of graphical patterns, wherein at least a speed at which the one or the plurality of graphical patterns is or are moved over an image display area of the image display unit is determined depending on the lateral movement speed of the movable real object relative to the surroundings, and amplifying or attenuating the speed information of the lateral movement speed of the movable real object during conversion into the speed at which the one or the plurality of graphical patterns is or are moved over the image display area of the image display unit.

14. The device as claimed in claim 13 further comprising at least one head tracker or an interface to a head tracker, wherein the computer is configured to have produced visually conformally outputted graphical information on the image display unit based on input from the at least one head tracker or the interface to the head tracker.

15. A movable real object comprising a device as claimed in claim 13.

16. A non-transient computer readable medium encoded with instructions executable on a computer for computer controlled display of speed information representing movement speed of a movable real object relative to surroundings of the movable real object, wherein the instructions provide for:

generating one or a plurality of visually perceptible moving graphical patterns on the image display unit, wherein non-zero lateral movement speeds of the movable real object are always reproduced qualitatively by movement of the one or the plurality of graphical patterns, wherein at least a speed at which the one or the plurality of graphical patterns is or are moved over an image display area of the image display unit is determined depending on the lateral movement speed of the movable real object relative to the surroundings, and amplifying or attenuating the speed information of the lateral movement speed of the movable real object during conversion into the speed at which the one or the plurality of graphical patterns is or are moved over the image display area of the image display unit.

* * * * *